United States Patent [19]

Mickelson

[11] Patent Number: 4,717,699

[45] Date of Patent: Jan. 5, 1988

[54] PROCESS FOR ACID TREATING CLAY FOR IMPROVED FILTRATION

[75] Inventor: Grant A. Mickelson, Yorba Linda, Calif.

[73] Assignee: American Colloid Company, Arlington Heights, Ill.

[21] Appl. No.: 815,704

[22] Filed: Jan. 2, 1986

[51] Int. Cl.⁴ .......................... B01J 20/12; B01J 20/30
[52] U.S. Cl. ......................................... 502/83; 502/81
[58] Field of Search .............................. 502/83, 82, 81

[56] References Cited

U.S. PATENT DOCUMENTS

| | | | |
|---|---|---|---|
| 1,976,127 | 10/1934 | Huber | 502/83 |
| 2,192,000 | 2/1940 | Wilson | 502/83 |
| 2,484,828 | 10/1949 | Hickey | 502/83 |
| 2,495,751 | 1/1950 | Mills et al. | 502/83 |
| 2,892,800 | 6/1959 | Taipale | 502/82 |
| 2,981,697 | 4/1961 | Mickelson et al. | 502/82 |

FOREIGN PATENT DOCUMENTS 939938 10/1963 United Kingdom .................. 502/82

Primary Examiner—Carl F. Dees
Attorney, Agent, or Firm—Mason, Kolehmainen, Rathburn & Wyss

[57] ABSTRACT

A method of treating clay with acid to beneficiate the clay for increased capacity of filtration of oil-soluble colorant compounds from oil. The clay is ground to a particle size distribution such that more than 50% by weight of the clay, on a dry basis, passes through a 200 mesh screen and less than 5% by weight of the clay, on a dry basis, is finer than 5 microns. After grinding, the ground clay is directly contacted with an acid solution to form an acid slurry of the clay. The clay acid slurry is agitated for a time sufficient and at a temperature sufficient so that the acid reacts with a portion of the clay and, thereafter, the acid treated clay is separated from the acid solution; the clay then is washed to remove most of the acid solution from the clay; filtered to a liquid content less than about 60% by weight and thereafter dried to a liquid content less than about 20% by weight.

32 Claims, No Drawings

PROCESS FOR ACID TREATING CLAY FOR IMPROVED FILTRATION

FIELD OF THE INVENTION

The present invention is directed to a process for acid treatment of clay to beneficiate the contaminant filtration characteristics of the clay. More particularly, the present invention is directed to a method for acid treatment of clays wherein the clay is pre-dried and directly treated with an acid solution, prior to any substantial re-wetting of the clay, at an acid concentration of 12-35% by weight acid, rendering the acid treated clay unexpectedly easier to wash and dewater and enabling acid treatment at higher solids contents for unexpectedly better drying economy. The acid treated clays are used for filtration of contaminant coloring compounds found in vegetable oils, animal fats, mineral oils, petroleum fractions, or any other liquids containing colorant contaminants.

BACKGROUND OF THE INVENTION AND PRIOR ART

It is well known that many naturally occurring clays may be acid treated to enhance their ability to decolorize oils. One of the most common clays used in this field is bentonite clays, particularly the non-water swelling bentonite clays such as calcium and magnesium bentonites. These acid activated bentonite clays are used for decolorizing or bleaching of various oils such as mineral oils, vegetable oils, various fractions from petroleum, especially lubricating oils, and the refining of used lubricating oils, and purification of melted animal fats and beeswax.

In the early 1900's, it was discovered that the bleaching power of clays such as bentonite could be enhanced far better than the bleaching power of the best crude clays in use at that time provided that the clay was first treated with a mineral acid such as hydrochloric or sulphuric acid and washed substantially free of dissolved salts and residual acid. The general process of acid activation of clays, as used today in industry, includes grinding the clay for uniform activation and dispersion in water; slurrying the ground clay in water and then adding acid to the clay slurry in an attempt to achieve a substantially uniformly activated clay. Usually about 6 to 8 hours of acid digestion is necessary to properly acid activate the clay. The digested slurry then is washed substantially free of dissolved salts such as iron and aluminum sulfates or chlorides, depending upon the particular mineral acid used. The acid activated clay then is dewatered, such as by filtration, and the resulting filter cake is dried and subsequently ground to product specifications.

One of the main disadvantages of the presently used commercial process for acid activation of clays is that the filtration and washing steps proceed very slowly, such as in a filter press. Presently existing commercial processes using a filter press for filtration and washing result in a filter cake having only 35 to 40% by weight solids. Accordingly, the energy requirements for the removal of most of this 60 to 65% weight by water in the drying operation is excessive and uneconomical.

The following patents describe various processes for treatment of clay to enhance the filtering characteristics of the clay in the removal of colorizing compounds: U.S. Pat. Nos. 1,408,655; 1,524,843; 1,408,656; 1,402,112; 1,544,210; 1,731,702; and 1,739,734.

SUMMARY OF THE INVENTION

In brief, the present invention is directed to a method of treating clay with acid to beneficiate the clay for increased capacity of filtration of oil-soluble colorant compounds from oil. In accordance with the present invention, the clay is ground to a particle size distribution such that more than 50% by weight of the clay, on a dry basis, passes through a 200 mesh screen and less than 5% by weight of the clay, on a dry basis, is finer than 5 microns. After grinding, the ground clay is directly contacted with an acid solution to form an acid slurry of the clay. The clay acid slurry is agitated for a time sufficient and at a temperature sufficient so that the acid reacts with a portion of the clay and thereafter the acid treated clay is separated from the acid solution; the clay then is washed to remove most of the acid solution from the clay; filtered to a liquid content less than about 60% by weight and thereafter dried to a liquid content less than about 20% by weight.

Accordingly, an object of the present invention is to provide a process for the treatment of clay to increase the capacity of the clay for filtering colorant compounds and other contaminants from liquids, such as oils.

Another object of the present invention is to provide a new and improved process for acid treatment of clay by contacting ground clay directly with an acid solution, without first dispersing the clay in water, to fix the particle size distribution of the ground clay to be correlatable with that provided in the grinding process while mechanically, gently agitating the clay in the acid solution to prevent further reduction of the clay particle size.

A further object of the present invention is to provide a new and improved process for acid treatment of clay wherein the clay is initially ground to a particle size so that more than 50% of the clay particles pass through a 200 mesh screen and less than 5% of the clay particles are less than 5 microns in size and initially contacting the ground clay with an acid solution containing 12-35% by weight acid while the clay is relatively dry (less than 20% by weight water) such that initial hydration of the clay in the acid solution causes diffusion of acid, with the water, into the inner pores of the relatively large clay particles to acid activate the clay particles throughout.

Still another object of the present invention is to provide a new and improved process for the acid activation of clay to provide a clay having excellent color filtration properties at a relatively large particle size such that relatively little agglomeration of particles occurs, thereby providing a more compact filtration medium having substantially more surface area for colorant filtration thereby providing faster and easier washing and filtration of the acid activated clay during processing.

Another object of the present invention is to provide a new and improved method of acid activating clay particles to beneficiate the filtration characteristics of the clay by providing proper grinding of the clay to prevent a substantial portion of fine particles less than about 5 microns, and contacting the ground clay particles while in relatively dry form with an acid solution containing hydrochloric acid at a concentration of about 12 to about 25% by weight, or sulphuric acid at a concentration of about 12 to 35% by weight to fix the particle size of the clay and provide immediate diffusion of acid into the interstices of the clay particles.

Another object of the present invention is to provide a new and improved method of acid activating clay particles by heating the clay particles in acid solution after proper grinding of the clay to achieve faster mass transfer between the clay and the acid solution and to achieve faster washing and filtration of the acid activated clay particles during processing.

Still another object of the present invention is to provide a new and improved method of acid activating clay including initially grinding the clay particles and thereafter contacting the ground clay particles, having a moisture content of less than about 20% by weight, with an acid solution such that hydration of the clay particles diffuses acid into the inner portions of the clay particles thereby substantially fixing the particle size distribution to that achieved in the grinding process such that after the acid activation steps are completed, the acid activated clay has a particle size distribution substantially proportional to that achieved in the grinding process.

The above and other objects and advantages of the present invention will become apparent from the following detailed description of the preferred embodiment.

DETAILED DESCRIPTION OF THE PREFERRED EMBODIMENT

The process of the present invention is useful with any of the clays known to be used in bleaching or decolorizing by filtration, such as any of the bentonites, including swelling bentonites such as sodium bentonites or the non-swelling bentonites such as calcium magnesium bentonite. The process is also useful for clays dominated by high contents of smectite type clay minerals, such as any of the montmorillonites, nontronite and saponite, illite and hydrousmica types of clay minerals, halloysite, and slaking-type bentonites. The process does not appear to be useful on kaolinite dominated clay deposits. The resulting acid activated clays are superior in bleaching or decolorizing capability to the raw materials and to certain natural bleaching earths, such as Fuller's earth, known to be capable of decolorizing without acid activation.

In accordance with a preferred embodiment of the present invention, the raw material is derived from the so-called sub-bentonite or slaking-type bentonites which contain high levels of smectite clay, such as montmorillonite, nontronite, saponite or beidellite clay minerals wherein the predominant base exchange ions are calcium and/or magnesium ions and/or hydrogen ions.

The clay minerals, as recovered from a mineral deposit, generally contain about 15 to about 40% by weight moisture. Most known clay deposits in the United States contain about 30% or more water and are mined in the form of large, irregular chunks of soft, dense material difficult to grind or pulverize. The large chunks of clay generally are passed through a large dry-pan crusher to divide the chunks into a coarse granular product having a maximum particle size of about 2 centimeters. This material is more easily transported and charged to an appropriate drier for removal of the moisture to a level of about 8 to about 20% by weight water. The material can be dried to a moisture content less than about 8% by weight but further drying is uneconomical and unnecessary.

In accordance with an important feature of the present invention, it has been found that the clay material, prior to grinding to an appropriate particle size distribution, should not have a moisture content greater than about 20% by weight in order to achieve grinding to the appropriate particle size distribution. The clay material, pre-dried to 20% or less moisture is then ground to a particle size of about 10 to about 400 microns with most of the particles being in the range of 10-100 microns. In accordance with an important feature of the present invention, the clay particles should be ground such that more than 50% of the resulting particles pass through a 200 mesh screen and 5% or less of the particles are finer than 5 microns. To achieve the full advantage of the present invention, less than 1% of the ground clay particles should be finer than 5 microns.

It has been found, in accordance with the principles of the present invention, that grinding such that at least 95%, dry weight basis, of the ground clay particles have a particle size in the range of 5 to 400 microns; wherein less than 2% of the clay particles, dry weight basis, have a particle size greater than 400 microns and less than 3%, dry weight basis, have a particle size less than 5 microns. Proper grinding, coupled with contact of the ground, dry (less than 20% water) clay particles with an acid solution containing 12-35% by weight acid enables the clay particles to be fixed in particle size distribution proportional to that achieved in the grinding process while achieving an acid activated clay having substantially faster absorption of acid and substantially faster filtering and washing characteristics during processing.

After grinding the clay, as described above, to the appropriate particle size distribution and, while the clay is still relatively dry, having less than 20% by weight water, the ground particles are then gradually added, in their pre-dried form, to an agitated solution of acid, at an initial temperature of about to 25° to 75° C., and thereafter heated to 80° to 100° C. for complete acid activation, having an acid concentration of 12–35% by weight to achieve relatively fast diffusion of the acid into the pores of the ground clay particles. The ground clay is added to the acid solution at a rate such that the clay particles are dispersed in the warm acid solution without forming lumps or agglomerates of unwetted clay. The particular acid in the acid solution is not critical and may be sulphuric, hydrochloric, nitric, phosphoric, or any other acid in the art.

In accordance with an important feature of the present invention, the acid, determined on a 100% acid basis, should be included in the activation solution in an amount of 12 to 35% by weight acid and, to achieve the full advantage of the present invention, the acid concentration will vary depending on the acid in solution. In accordance with an important feature of the present invention, it has been found that hydrochloric and nitric acids, when used as the acid for the acid activation solution, should be present in the solution in an initial concentration in the range of 10 to 25% by weight acid and usually in the range of about 12 to 20% by weight acid. Best results with hydrochloric or nitric acids are achieved at an acid concentration of about 15% by weight.

In accordance with another important feature of the present invention, it has been found that when sulphuric acid is used as the acid in the acid activation solution, the concentration of sulphuric acid should be in the range of 10 to 35% by weight sulphuric acid and generally at a sulphuric acid concentration in the range of 15 to 25% by weight. To achieve the full advantage of the present invention when sulphuric acid is used in the acid activating solution, the sulphuric acid should be included at a concentration of 18 to 22% by weight sulphuric acid with best results being achieved at a sulphuric acid concentration of about 20% by weight.

The initial temperature of the acid activation solution is largely determined by the heat of dilution of the acid, but is generally in the range of about 25° to 75° C. More specifically, for sulphuric acid, it has been determined that the initial temperature of the acid activating solution should be in the range of about 50 to 65 degrees C. and for hydrochloric and nitric acids the initial temperature of the acid activation bath should be in the range of about 30 to about 45 degrees C. to achieve good diffusion of the acid into the interstices of the clay particles while fixing the particle size without breakdown or disintegration of the particles. The conditions for the initial contact of the ground clay particles in the acid activating bath should not create steam since the hydration of the clay particles and steam production within the interstices of the clay particles may cause breakdown and disintegration of the clay particles thereby producing a substantial portion of particles having a size less than 5 microns, causing excessive acid activation of the ultra fines, slower filtration and washing during the process of the present invention.

The ground clay particles are gradually added to the heated acid activation solution at a rate so that the particles are immediately wetted and dispersed in the acid slurry without forming lumps of partially wetted clay particles. Upon contact of the clay particles with the acid activating solution, the acid hardens the clay particles thereby fixing their size and minimizing their dispersion into ultra-fine particles less than 5 microns so that the particle size of the ground or pulverized raw material is maintained throughout the acid digestion period.

In accordance with an important feature of the present invention, the contact of the ground or pulverized clay particles with an acid solution, as opposed to initial dispersion of the ground or pulverized material into water and thereafter adding water to the slurry, produces a sandy material having non-sticky surfaces so that the clay particles do not form agglomerates to the extent that ground clay particles would if initially contacted with water. Accordingly, by initial contact of the relatively dry, ground clay particles with the acid solution at a concentration of 12–35% by weight acid, the particle size distribution of the clay is substantially fixed in the grinding or pulverizing process thereby substantially eliminating agglomerates of clay having a tendency to slow the steps of acid diffusion, filtration and washing needed in the acid activation process. Acid digestion is completed when approximately 80 to 90% of the acid has been reacted with the clay minerals and this is easily determined by monitoring the residual free acid in the digestion slurry. Acid activation generally is complete in a period of 6 to 8 hours and this can be determined by measuring the free acid in the digestion slurry to determine the extent of reaction with the clay minerals.

When acid activation has been completed, the acid treated clay is separated from a majority of the acid solution and then washed. Both steps of separating the acid treated clay from the acid solution and the washing of the acid treated clay can be achieved in a filter press. In accordance with a preferred embodiment of the present invention, the slurry of acid activated clay in the acid activation solution is pumped, while hot, to a chamber-type filter press having open drainage to extract the acid solution or mother liquor while filling the filter press chambers with the acid activated clay. The flow rate of the acid solution decreases when the chambers of the filter press are filled as a signal to stop the flow of acid activated clay into a filter press and to begin introducing wash water through the filter press. Generally, the filter press chambers are washed with wash water introduced at a pressure of about 20 to 50 pounds per square inch maintained until washing is complete. Washing the acid activated clay removes excess acid, dissolved iron, aluminum, magnesium, and calcium ions and other clay contaminants. The end of the washing step may be determined by monitoring the filtrate from each filtered chamber such as for pH, residual chlorides, and the like to determine when substantially clean water is being removed as a filtrate. Generally, washing is complete when the filtrate has a pH of about 2.5 to about 4 and, to achieve the full advantage of the present invention, the pH of the filtrate water should be in the range of about 3 to 3.5 as an indication that washing of the acid activated clay is complete. If residual chlorides are monitored to determine the completion of clay washing, the chlorides should be at a level of less than about 500 parts per million in the filtrate and preferably less than about 400 parts per million.

In accordance with an important advantage of the present invention, the hardened, pulverized or ground clay materials, rendered non-sticky and porous in the initial acid-hydration step of the process, results in a relatively porous, non-compacting filter cake having the capacity of much faster filtration and washing under relatively low wash water pressures to achieve more effective diffusion-type washing in the filter press.

In accordance with another important advantage of the process of the present invention, because of the physical nature of the clay particles resulting from the acid activation step, the filtered material retains less water than prior art filtered material when subjected to the same filtering apparatus. For example, in a chamber type filter press, the filter cake, when processed in accordance with the present invention includes about 45 to 55% by weight water compared to filter cakes which contain 60 to 65% by weight water if the same raw material is initially contacted and dispersed in water before adding acid to the slurry.

In accordance with another important advantage of the process of the present invention, the filter cake obtained is hardened and non-sticky so that it is easily charged to a drying apparatus with substantially no agglomeration of fine or recycling to the dryer necessary.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A method of treating clay with acid to provide the clay with increased effectiveness in filtering contaminants from a liquid for removal of said contaminants from the liquid comprising drying the clay to a moisture not greater than 20% by weight;

grinding the clay to a particle size distribution such that at least 95% of the particles, dry weight basis, have a particle size in the range of 5 to 400 microns, with less than 2% of the clay particles, dry weight basis, greater than 400 microns and less than 3% of the clay particles, dry weight basis, less than 5 microns;

adding the clay to an acid solution having an acid concentration of 10 to 35% by weight acid to form a clay slurry having a clay solids content of 15 to 45% by weight;

agitating said clay slurry having an acid content of 10-35% by weight and for a time sufficient and at a temperature of 80° C. to 100 ° C. so that the acid interacts with the clay to beneficeate the contaminant filtration characteristics of said clay to form an acid treated clay;

separating the acid treated clay from a majority of the acid solution;

washing the acid treated clay with a suitable acid-diluting liquid to remove most of the acid solution from the clay and form a washed, acid treated clay;

filtering the washed, acid treated clay to a liquid content less than about 60% by weight; and drying the acid treated clay to a liquid content less than about 20% by weight.

2. The method of claim 1 wherein the acid solution is an aqueous solution of HCl at a concentration of 10 to 25% by weight.

3. The method of claim 1 wherein the acid solution is an aqueous solution of $H_2SO_4$ at a concentration of 12 to 35% by weight.

4. The method of claim 2 or 3 including grinding the clay so that at least 90% by weight of the ground clay particles have a particle size of 5 to 100 microns.

5. The method of claim 2 or 3 including grinding the clay so that at least 95% of the clay particles have a particle size of 5 to 400 microns.

6. The method of claim 1 wherein the clay, after filtration, has a liquid content of 20 to 45% by weight.

7. The method of claim 1 wherein the clay slurry has a clay solids content of 30 to 45% by weight.

8. The method of claim 1 wherein the clay slurry is heated, with agitation, for at least 3 hours to beneficiate the contaminant filtration characteristics of the clay.

9. The method of claim 8 wherein the clay slurry is heated, with agitation, at a temperature of 90° to 100° C. for 4 to 12 hours to beneficiate the clay.

10. The method of claim 1 wherein the clay is dryed to a moisture content of 25% by weight or less prior to grinding.

11. The method of claim 10 wherein the clay is dryed to a moisture content of 10-18% by weight prior to grinding.

12. The method of claim 1 wherein the acid treated clay is separated from the acid solution, prior to washing, to form a clay having a 40 to 50% by weight solids content.

13. The method of claim 12 wherein the acid treated clay is separated from the acid solution in a filter press to form a clay cake having a 40 to 50% by weight solids content; the clay cake then is washed with water in the filter press for a time sufficient to achieve a wet clay cake having a pH of 2.5 to 4.0; and thereafter the wet clay cake is further dewatered in the filter press to a solids content of 45 to 55% by weight, prior to drying.

14. A method of treating clay with an acid solution, prior to any substantial wetting of the clay without acid, to increase the effectiveness of said clay to absorb all soluble coloring compounds from oil without any substantial grinding needed after acid treatment, comprising:

drying the clay to a water content less than or equal to 20% by weight;

grinding the clay to a predetermined, final particle size distribution such that at least 95% of the particles, dry weight basis, have a particle size in the range of 5 to 400 microns, with less than 2% of the clay particles, dry weight basis, greater than 400 microns and less than 3% of the clay particles, dry weight basis, less than 5 microns;

forming an aqueous acid solution having an acid concentration of 10 to 35% by weight acid;

adding said ground clay, having a water content less than about 25% by wdight, to said acid solution to form a clay slurry having a clay content of 20 to 45% by weight dry solids;

agitating the clay slurry for a time sufficient and at a temperature of 80° C. to 100° C. to achieve sufficient mass transfer between the clay and the acid solution to improve the absorption capacity of the clay for oil soluble coloring compounds;

removing a majority of the acid solution from the clay slurry;

washing the acid treated clay with water to remove most of the acid solution from the clay;

dewatering the acid treated clay to a solids content of at least 40% by weight; and drying the acid treated clay to a solids content of at least 80% by weight.

15. The method of claim 14 wherein the acid solution is an aqueous solution of HCl at a concentration of 10 to 25% by weight.

16. The method of claim 14 wherein the acid solution is an aqueous solution of $H_2SO_4$ at a concentration of 12 to 35% by weight.

17. The method of claim 15 or 16 including grinding the clay so that at leat 90% by weight of the ground clay particles have a particle size of 5 to 100 microns.

18. The method of claim 15 or 16 including grinding the clay so that at least 95% of the clay particles have a particle size of 5 to 400 microns.

19. The method of claim 14 wherein the clay, after filtration, has a liquid content of 45% to 55% by weight.

20. The method of claim 14 wherein the clay slurry has a clay solids content of 20 to 45% by weight.

21. The method of claim 14 wherein the clay slurry is heated, with agitation, for at least 3 hours to beneficiate the contaminant filtration characteristics of the clay.

22. The method of claim 21 wherein the clay slurry is heated, with agitation, at a temperature of 90° to 100° C. for 4 to 12 hours to beneficiate the clay.

23. The method of claim 14 wherein the clay is dryed to a moisture content of 25% by weight or less prior to grinding.

24. The method of claim 23 wherein the clay is dryed to a moisture content of 10-18% by weight prior to grinding.

25. The method of claim 14 wherein the acid treated clay is separated from the acid solution, prior to washing, to form a clay having a 40 to 50% by weight solids content.

26. The method of claim 25 wherein the acid treated clay is separated from the acid solution in a filter press to form an activated clay cake having a 40 to 50% by weight solids content; the activated clay cake then is washed with water in the filter press for a time sufficient to achieve a wet clay cake having a pH of 2.5 to 4.0; and thereafter the wet activated clay cake is further dewatered in the filter press to a solids content of 45 to 55% by weight, prior to drying.

27. The method of claim 14 including adding the acid treated clay to a liquid colorant-contaminated oil for absorption of the liquid colorant material therefor, without a grinding step after the acid treated clay is finally dryed.

28. The method of claim 14 wherein 99+% of the ground clay passes through a 35 mesh screen.

29. The method of claim 14 wherein 99+% of the ground clay passes through a 100 mesh screen.

30. The method of claim 14 wherein 99+% of the ground clay passes through a 150 mesh screen.

31. The method of claim 1 wherein the clay slurry is heated to a temperature of at least 80° C. to beneficiate the contaminant filtration characteristics of the clay.

32. The method of claim 14 wherein the clay slurry is heated to a temperature of at least 80° C. to beneficiate the contaminant filtration characteristics of the clay.

* * * * *

UNITED STATES PATENT AND TRADEMARK OFFICE
CERTIFICATE OF CORRECTION

PATENT NO. : 4,717,699
DATED : January 5, 1988
INVENTOR(S) : Grant A. Mickelson

It is certified that error appears in the above-identified patent and that said Letters Patent is hereby corrected as shown below:

Column 7, line 19, "beneficeate" should read --beneficiate--;
      line 35, "H2SO4" should read -- $H_2SO_4$ --;
Column 8, line 21, "wdight" should read -- weight --.
      line 41, "H2SO4" should read -- $H_2SO_4$ --.

Signed and Sealed this

Twelfth Day of April, 1988

Attest:

DONALD J. QUIGG

Attesting Officer      Commissioner of Patents and Trademarks